Oct. 5, 1948.                F. C. GULLO                2,450,590
                              FRUIT DRIER
Filed Feb. 18, 1946                              2 Sheets-Sheet 1
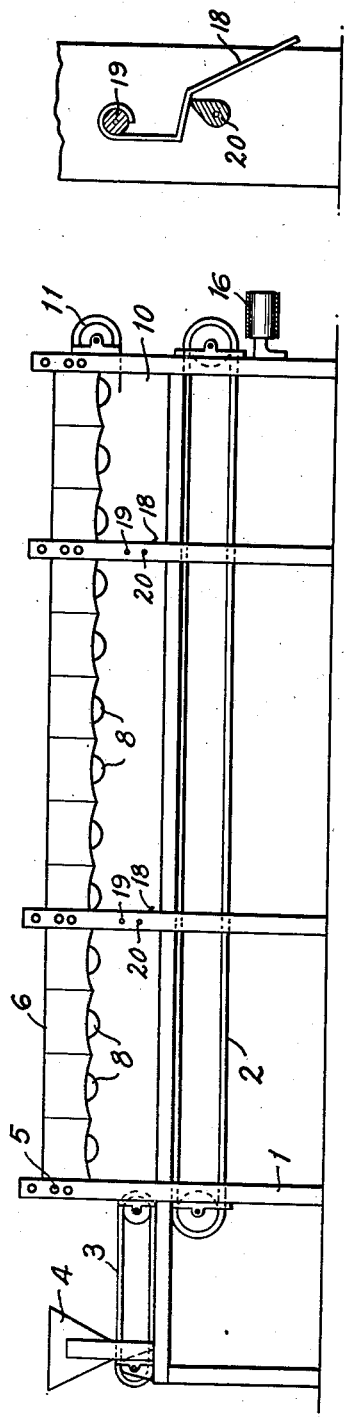
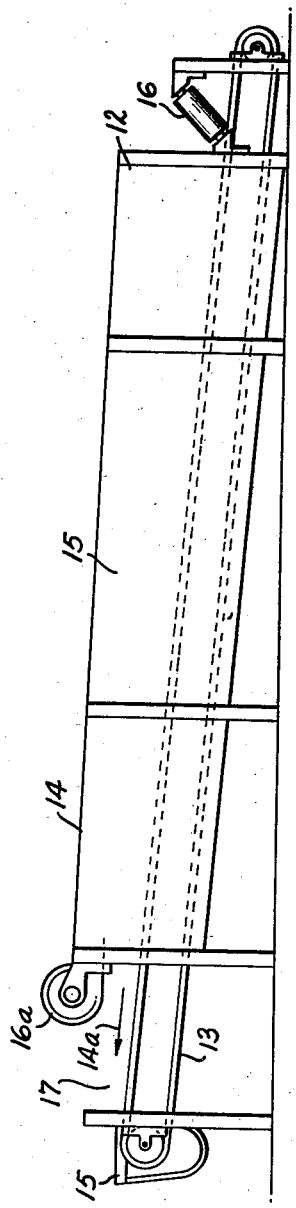
INVENTOR
FRANK C. GULLO
BY John A. Naismith
ATTORNEY Oct. 5, 1948.  F. C. GULLO  2,450,590
FRUIT DRIER
Filed Feb. 18, 1946  2 Sheets-Sheet 2
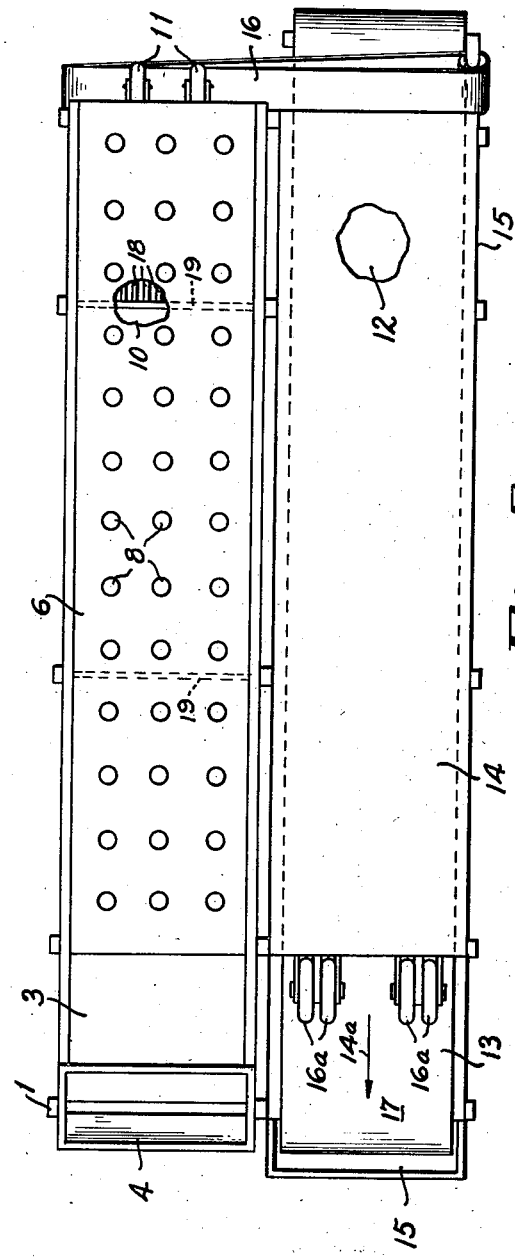
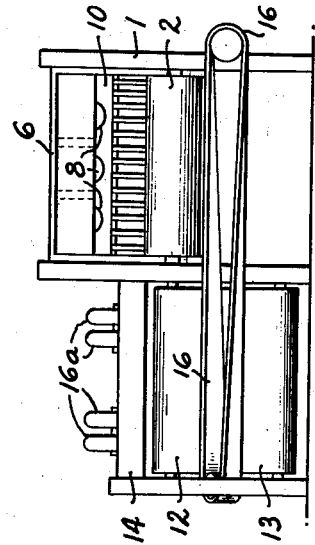
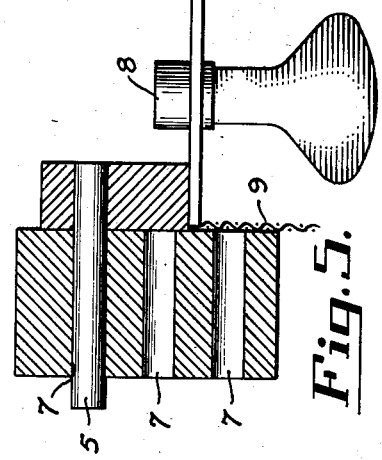
INVENTOR
FRANK C. GULLO
BY John A. Chainsmith
ATTORNEY Patented Oct. 5, 1948

2,450,590

UNITED STATES PATENT OFFICE 2,450,590

FRUIT DRIER

Frank C. Gullo, Cupertino, Calif.

Application February 18, 1946, Serial No. 648,214

1 Claim. (Cl. 34—66)

The present invention relates to means for drying fruit, and particularly to the infra-red light rays as applied to the drying of fruits.

It is an object of the present invention to provide a machine for drying fruits such as prunes that is constructed and arranged to utilize the infra-red rays emitted by properly constructed lamps in the drying process.

It is also an object of the invention to provide a machine of the character indicated that will permit adjustment of the lamps relative to the fruit being dried according to the necessities of the case, and to provide means for controlling the humidity of the infra-red tunnel.

It is a further object of the invention to provide means for subjecting the fruit to the action of infra-red rays for a predetermined period of time, and then to a blast of cooling and drying air for a predetermined period of time, together with means for transferring the fruit from one stage to the other without halting its movement.

It is also an object of the invention to provide a machine of the character indicated that will be economical to manufacture, simple in form and construction, compact, strong and durable, and highly efficient in its practical application.

In the drawing:

Figure 1 is a side elevation of the infra-red treatment portion of my invention, with side curtains removed.

Figure 2 is a side elevational view of the warm air treatment portion of my invention.

Figure 3 is a top plan view of a device embodying my invention.

Figure 4 is an end elevational view of the machine.

Figure 5 is an enlarged sectional view on line 4—4 of Figure 1.

Figure 6 is a detail illustration of the fruit turning mechanism.

It is to be understood, of course, that while I have hereinafter described in detail one specific embodiment of the invention, changes in form, construction, and mode of operation may be made within the scope of the appended claims without departing from the scope of the invention.

Referring now more particularly to the drawing, I show at 1 a framework having a travelling belt 2 mounted thereon to carry fruit away from the feeding belt 3 which in turn receives the fruit from hopper 4.

Adjustably mounted as at 5 on the top ends of framework 1 is a top covering member 6 which may be raised or lowered in any suitable manner as by adjusting pegs 5 in holes 7, this top member 6 having a number of infra-red lamps 8 depending from its under side, and connected to a suitable source of electricity supply not shown. Curtain members 9 depend from the side edges of top member 6 to form, with the top and belt, a tunnel 10.

Blowers as 11 are disposed at the discharge end of tunnel 10 for the purpose hereinafter described.

A second tunnel 12 is arranged parallel to the first named tunnel 10 with an inclined floor as shown in Figure 2, this floor consisting of a travelling belt 13 moving in the direction indicated by arrow 14a, and discharging into a trough 15 and thence to suitable containers. Since the two tunnels 10 and 12 are contiguous to each other the fruit discharged from belt 2 may be easily transferred to belt 13 by allowing the fruit to fall from belt 2 on to a transversely arranged belt 16 which overlies the receiving end of belt 13 and gradually assumes a laterally inclined position so that the fruit thereon is caused to roll off onto the belt 13 as it passes thereover.

The tunnel is formed with a top 14 and curtain sides as at 15 the bottom being formed by the belt 13, and blowers 16a are disposed at the discharge end of the tunnel to blow air therethrough in a direction opposite to the direction of movement of the belt 13. A portion of the belt 13 at its discharge end is uncovered by the tunnel as indicated at 17, and this uncovered portion may be used for inspection of the fruit where unwanted fruit is discarded.

In use, a quantity of fruit to be dried is dumped into the hopper 4, and from this hopper 4 it falls upon the belt 3 where it may be washed and cleaned as it is carried to, and discharged upon belt 2. The belt 2 carries the fruit through the tunnel 10 and beneath the infra-red lamps 8 where it is subjected to the drying action of said lamps until it is discharged upon the transfer belt 16, at the same time the air blown through the tunnel 10 in the direction opposite to the movement of the fruit removes the moisture-laden air and prevents moisture from accumulating on the lamps 8 and in this manner reducing their efficiency.

The fruit discharged upon belt 16 is transferred to, and discharged upon belt 13 which carries it through the tunnel 12. Here it is subjected to the final drying effect of air from blowers 16a, is inspected at 17 and finally is discharged into trough 15 and the process is completed.

The fruit must be turned occasionally as it is carried along on carrier 2 beneath lamps 8, and this I accomplish by means of fingers 18 mounted on shafts as 19 extending transversely of the drying tunnel at suitable points between the side portions of frame 1. The fingers 18 extend downwardly from the shaft 19, thence at an obtuse angle in the direction of movement of the fruit, and then downwardly into the path of travel of the fruit. Since the fruit varies widely in size and these fingers are intended to contact only the upper portion and cause it to turn I provide a shaft 20 parallel to the shaft 19 and just underneath the center angular portion of the fingers and in the form of a cam, that is, eccentric to its turning center so as to raise the fingers 18 or lower the same as desired when the shaft 20 is rotated a distance. This structure is shown in detail in Figure 6.

The means for driving and coordinating the movement of the several belts is a matter of common practice and is not shown.

Having thus described my invention, what I claim as new and desire to secure by Letters Patent is:

A machine for drying fruit comprising, a pair of side by side parallel tunnels, one tunnel having a bottom wall, a vertically adjustable top wall, a battery of infra-red lamps depending from said top wall and having a conveyor in its bottom to carry fruit therethrough, the other being a cooling tunnel having top, side and bottom walls with a conveyor on its bottom wall to carry fruit in the opposite direction to the movement of the fruit in the first tunnel, blowers arranged at the discharge end of each tunnel to blow air therethrough in the direction opposite to the movement of the fruit, and means operative to transfer the fruit from the discharge end of the first tunnel to the receiving end of the second tunnel, said means comprising a transversely arranged belt disposed below the level of one belt and overlying the other belt and gradually assuming a laterally inclined position as it passes from one belt to the other.

FRANK C. GULLO.

REFERENCES CITED

The following references are of record in the file of this patent:

UNITED STATES PATENTS

| Number | Name | Date |
|---|---|---|
| 596,470 | Blanchard | Jan. 4, 1898 |
| 784,854 | Grace | Mar. 14, 1905 |
| 931,873 | Hough et al. | Aug. 24, 1909 |
| 1,284,218 | Benjamin | Nov. 12, 1918 |
| 1,339,092 | Benjamin | May 4, 1920 |
| 1,380,343 | Balzer | June 7, 1921 |
| 1,470,653 | Sullivan | Oct. 16, 1923 |
| 2,275,588 | Greene | Mar. 10, 1942 |
| 2,281,184 | Dykstra et al. | Apr. 28, 1942 |
| 2,349,300 | Olsen | May 23, 1944 |
| 2,419,875 | Birdseye | Apr. 29, 1947 |
| 2,419,876 | Birdseye | Apr. 29, 1947 |